(12) United States Patent
Marangoni et al.

(10) Patent No.: US 7,718,210 B2
(45) Date of Patent: *May 18, 2010

(54) FOOD PRODUCT

(75) Inventors: Alejandro G. Marangoni, Ontario (CA); Stefan H. J. Idziak, Ontario (CA)

(73) Assignee: Coavel Inc., Guleph, Ontario (CA)

( * ) Notice: Subject to any disclaimer, the term of this patent is extended or adjusted under 35 U.S.C. 154(b) by 1441 days.

This patent is subject to a terminal disclaimer.

(21) Appl. No.: 10/998,539

(22) Filed: Nov. 30, 2004

(65) Prior Publication Data
US 2005/0249856 A1   Nov. 10, 2005

Related U.S. Application Data

(63) Continuation-in-part of application No. 10/840,276, filed on May 7, 2004.

(51) Int. Cl.
  *A23D 9/013* (2006.01)
(52) U.S. Cl. .................. 426/602; 426/564; 426/654
(58) Field of Classification Search ........... 426/602, 426/654, 564
  See application file for complete search history.

(56) References Cited

U.S. PATENT DOCUMENTS 3,914,458 A * 10/1975 Terada et al. ............... 426/604
3,966,632 A * 6/1976 Colliopoulos et al. ......... 516/29
4,446,165 A * 5/1984 Roberts ..................... 426/602
4,454,113 A * 6/1984 Hemker ...................... 424/63
5,472,728 A * 12/1995 Miller et al. ............... 426/601
5,948,825 A * 9/1999 Takahashi et al. .......... 424/85.2
6,156,369 A   12/2000 Eger et al.
6,368,653 B1   4/2002 Heertje et al.
6,569,478 B1   5/2003 Leser et al.
6,808,737 B2   10/2004 Ullnoormadam
7,351,440 B2 * 4/2008 Perks et al. ................ 426/564
2002/0012739 A1 * 1/2002 Cornelissen et al. ........ 426/606
2004/0086622 A1 * 5/2004 Pelan et al. ................. 426/602

FOREIGN PATENT DOCUMENTS

| CA | 2048401 | 2/1992 |
| CA | 2126483 | 12/1994 |
| CA | 2171763 | 3/1995 |
| CA | 2096429 | 4/1999 |

OTHER PUBLICATIONS

International Search Report Dated Aug. 18, 2005 for International Application No. PCT/CA2005/000692 Filed May 6, 2005.

* cited by examiner

*Primary Examiner*—Carolyn A Paden
(74) *Attorney, Agent, or Firm*—Gowling Lafleur Henderson LLP

(57) ABSTRACT

The present invention provides a novel cellular solid structure which can be used to structure an oil-water mixture into a semi-solid state. The invention is particularly useful in the manufacture of food products, such as margarine-like spreads, other spreads and dips and dairy-like products such as whipped toppings and creamy fillings.

19 Claims, 7 Drawing Sheets

FOOD PRODUCT

RELATED APPLICATIONS

This application is a continuation-in-part of application Ser. No. 10/840,276 filed on May 7, 2004.

FIELD OF INVENTION

The present invention relates to products for a healthy lifestyle. In particular, it relates to an oil-based food product that has reduced trans fats and preferably low or virtually no animal fats or tropical oils.

BACKGROUND OF THE INVENTION

Triacylglycerols (TAGs) are the main constituent of edible fats and oils. TAGs are composed of three fatty acids esterified onto a glycerol backbone. Fatty acids are usually linear molecules composed of long aliphatic carbon chains that can range from four to twenty-two carbons in length. Fatty acids can be saturated or unsaturated. When a fatty acid is saturated, it means each carbon atom is attached to another carbon atom via a single covalent bond. Fats and oils containing predominantly saturated fatty acid will be solid at room temperature. Examples of saturated fats include animal fat such as milk fat or lard and tropical oils such as palm oil, palm kernel oil and coconut oil. A fatty acid is unsaturated when carbon-carbon double bonds are present within the chain of carbon atoms. A carbon-carbon double bond can adopt one of two conformations, namely cis and trans. Fats and oils containing unsaturated fatty acids with cis double bonds are usually liquid at room temperature. Examples of unsaturated fats include vegetable oils such as soybean, canola and cottonseed oils. Fats and oils containing unsaturated fatty acids with trans double bonds, on the other hand, are solid at room temperature. The difference between a fat and an oil is subtle. Generally, if the melting point of the TAGs is higher than about 30° C., the material is solid at room temperature, and is therefore referred to as a 'fat'. On the other hand, if the melting point of the TAGs is lower than about 15° C., the material will appear liquid at room temperature, and will thus be referred to as an 'oil'. Natural fats and oils are complex mixtures of TAGs with extremely varied chemical compositions.

Unsaturated fatty acids are generally in the cis conformation. However, when an oil is partially hydrogenated, various amounts of the cis form are converted to a more stable trans configuration, and are thus called trans fatty acids. Hydrogenation is a process by which a hydrogen molecule is added to an unsaturated double bond. Hydrogenation is a way of making vegetable oils harden at room temperature. Small particles of nickel or copper catalyst are added and the mix is heated to high temperatures under pressure and agitation for up to eight hours while hydrogen gas is injected. From the time the British patent on liquid phase hydrogenation was issued to Norman in 1903, and its introduction in the U.S. in 1911, few chemical processes have made as great an economic impact on any industry. Hydrogenation opened new markets for vegetable oil based on specialty products. Three reactions take place during hydrogenation—the saturation of carbon-carbon double bonds, the conversion of cis geometric isomers into more stable trans isomers, as well as the creation of new positional isomers, where double bonds are shifted to new positions along the fatty acid chain. Both the saturation of double bonds as well as the cis to trans isomerization of double bonds will result in an increase in the melting point of a fat. Thus, cooling of this hydrogenated fat below the melting point of the newly created triacylglycerol species containing saturated and trans fatty acids, will lead to the partial crystallization of the material. This semisolid fat matrix will therefore be structured as a network of fat crystal aggregates with liquid oil trapped within. The solid-like characteristics of this material are due to this underlying fat crystal network. Without this network of crystallized fat, the material would be an oil.

Manufacturers use the hydrogenation process to convert vegetable oil into a solid form for the manufacture of margarine, shortening and spreads. The process is also used to increase the shelf life and flavor stability of food products containing vegetable oils. During hydrogenation, anywhere from eight to seventy percent of the fatty acid content will be converted to trans fatty acids. The amount of conversion depends on the process and the desired product.

Trans fatty acids also occur naturally. When unsaturated fatty acids are ingested by ruminants (i.e., cows) the fatty acids can be partially hydrogenated by bacteria in the rumen of the animal (stomach) and thus trans fatty acids can be found in milk fat, dairy products, beef and mutton fat. Trans fatty acids usually make up about two to nine percent of the fat in these products. Ruminant animals are not the only animals in which this process occurs. Chicken and pigs often ingest trans fatty acids through the feed they are given and the trans fatty acids make their way into pork and poultry products.

Over the past 50 years hydrogenated oils have become a prevalent part of the diet in developed countries. Margarine is an example of a product that contains hydrogenated oils and it is one of the most common sources of hydrogenated oil in our diets. These hydrogenated oils have become so commonplace in prepared foods that it is a major feat to avoid them. Margarine is sometimes marketed as a healthy alternative to saturated fats like butter and lard. However while these products start out as unsaturated oils, the final product includes trans fatty acids that are increasingly under attack as major contributors to cardiovascular disease.

New research into the role fats and oils play in human health has indicated that consumption of trans fatty acids is associated with increased incidences of cancer, heart disease, elevated cholesterol levels and a host of other health problems. Over ten years of clinical and epidemiological research suggest that there is a positive linear relationship between trans fatty acid intake and a decrease in serum HDL ('good' cholesterol) combined with an increase in serum LDL ('bad' cholesterol). These combined effects increase the risk of coronary heart disease. Both the Institute of Medicine and the American Heart Association recommend a reduction in the intake of trans fatty acids, and to preferably eliminate them altogether from the diet. This is difficult to achieve without proper labeling of foods. Prompted originally by the Center for Science in the Public Interest back in 1994, the U.S. Food and Drug Administration (FDA) has decreed that, as of January of 2006, food manufacturers must include the trans fatty acid content in product labels.

Long before the health risks associated with trans fatty acids were realized, it was known that consumption of animal fats and tropical oils had a negative effect on cardiovascular health. The American Heart Association (AHA) discourages the consumption of animal fats such as butter (milk fat), lard (pig fat), tallow (beef fat) due to their relatively high content of cholesterol and saturated fatty acids, which makes them highly atherogenic—they contribute to the build up of cholesterol and other substances in artery walls. The AHA also discourages the consumption of trans fats. Moreover, the AHA also discourages the consumption of tropical oils such as palm oil, palm kernel oil and coconut oil due to their high saturated fatty acid content.

The need for a healthy alternative to trans fatty acids and saturated fats creates technological hurdles for the food manufacturing industry. It is difficult to eliminate trans fats from a food formulation where the goal is to transform an oil, which is liquid at room temperature to a fat, which is 'solid' at room temperature to enhance texture and appearance of a food product.

There have been various attempts in the food industry to provide an edible oil product that is solid at room temperature and that contains little or no trans fatty acids or saturated fats. For example, U.S. Pat. No. 6,569,478 discloses a food composition comprising at least one food ingredient in a monoglyceride mix in an amount sufficient to form a mesomorphic structure which substantially encapsulates the food ingredient and water.

U.S. Pat. No. 6,156,369 discloses a food spread comprising a non-aqueous mixture of an edible oil and a monoglyceride in an amount of from about 85% to about 98% edible oil and from about 2% to about 15% monoglyceride.

Canadian Patent No. 2,096,429 discloses a finished foodstuff comprising bulk regions of a mesomorphic phase of edible surfactant and less than 80 wt % edible oil, and wherein the mesomorphic phase is a continuous phase and/or contains 80 wt % or more of water as well as methods of making and using the foodstuff.

Much of the effort to create low-trans and saturate fat alternatives has focused on the use of monoglyceride gels. The early work on monoglyceride gels focused on aqueous lyotropic systems only. When heated above their 'Kraft' temperature, monoglycerides and other amphiphillic molecules, can form lamellar phases structured as alternating layers of monoglyceride bilayers and water. Upon cooling, monoglycerides will crystallize into kinetically favored, but thermodynamically metastable forms, yielding an alpha-gel. This alpha-gel is structured in a similar fashion as the lamellar phase—water layers sandwiched between monoglyceride bilayers. Upon ageing, alpha-gels tend to rearrange into beta-gels, or coagels, upon transformation of monoglyceride crystals into more thermodynamically stable crystal forms. In these coagels, however, water layers are squeezed out of the gel structure, leaving behind stacked monoglyceride bilayers.

These mesophases (alpha-gels and coagels) were the subject of a flurry of research activity and several patents by Unilever R&D. In all of this work, aqueous mesophase gels—, usually of water contents greater than 80%—were mixed with a variety of materials for structuring purposes. Under vigorous mixing (high shear), aqueous mesophase gel material was dispersed within other phases until some kind of stabilization was achieved. This method of making monoglyceride gels limited this technology to the manufacture of low-fat edible spreads. Monoglycerides can also be used to structure pure oil, but in that case, monoglycerides are used as a conventional hardstock, and not as a mesophase gel.

Using standard techniques of blending, interesterification (chemical and enzymatic) and fractionation, it is virtually impossible to produce a spread having the texture of a tub-type margarine without incorporating saturated fats and/or trans fatty acids. Thus, there has long been an unmet need for alternative technologies to provide a product that has the consumer desired features of texture and spreadability without harmful trans fats, animal fats and tropical oils.

SUMMARY OF THE INVENTION

The present invention provides a new strategy for the manufacture of a product having the properties of a plastic fat without the addition of traditional saturated and trans fat hardstocks (blending), sometimes followed by chemical or enzymatic interesterification. This strategy does not include fractionation either.

The present invention provides novel food products that are oil-based and have a fat-like (i.e. plastic solid) consistency yet contain low levels of trans and saturated fatty acids. This consistency is achieved through the formation of a cellular solid. The cellular solid is a matrix of cells having walls that can compartementalize components of the food product.

In a preferred embodiment, a food product that is trans fatty acid free is provided.

In one aspect, the present invention provides a process for preparing an edible oil product that can be used to replace products high in fats.

The process for the preparation of a cellular solid comprises the steps of:
a. preparing a stock solution of surfactant in oil;
b. heating the stock solution to the melting point of the surfactant;
c. adding a heated aqueous solution to form an oil/surfactant/aqueous composition;
d. vigorously mixing the composition; and
e. allowing the composition to cool, wherein the composition sets upon cooling to form a cellular solid.

In a preferred embodiment of the process, the stock solution comprises a non-ionic surfactant in an oil. In a further preferred embodiment, the stock solution also comprises an ionic surfactant.

In a preferred embodiment, the stock solution comprises about 3 to 30% (w/w), more preferably about 5 to 15% (w/w) of surfactant.

In yet another embodiment, the aqueous solution may or may not be buffered. Preferably alkaline deionized or distilled water is used to form the oil/surfactant/aqueous composition.

In a further preferred embodiment, the composition is sheared while above the melting point until a paste is obtained and the composition is then allowed to set to a semi-solid state. The composition can be allowed to set at a variety of temperatures depending on the relative amounts of the components. In a preferred embodiment, the composition is cooled relatively quickly to prevent phase separation (e.g. 0.5° C./min or faster). The composition can be allowed to set at room temperature or in the fridge.

In a preferred embodiment the stock solution comprises about 5 to 15% of the surfactants and has a melting point of about 30° C. to 90° C.

In another preferred embodiment the oil/surfactant/aqueous composition comprises about 10 to 70%, more preferably 20 to 60% water. The oil for use in the composition may be a vegetable oil, a fish oil or an animal oil. Some examples of vegetable oils that can be used in the process of the invention include corn oil, canola oil, sunflower oil, safflower oil, soybean oil, peanut oil, olive oil, flaxseed oil and rice bran oil.

In another aspect of the invention, the composition is whipped to provide a cellular solid with pockets of air dispersed within it. The composition is preferably whipped while it is cooling.

In another embodiment, a polysaccharide or protein is incorporated into the cellular solid. The polysaccharide or protein can be added to the aqueous phase before the aqueous phase is added to the oil phase or the polysaccharide or protein can be added after the cellular solid matrix has begun to form.

In another aspect, a cellular solid product prepared by the process described above is provided. The cellular solid comprises condensed surfactant cells walls that compartementalize an oil component.

In yet another aspect of the invention, an edible food product is provided. The food product incorporates a cellular solid matrix formed by the interaction of an oil phase and an aqueous phase. The oil phase comprises a non-ionic surfactant, an oil and, optionally, an ionic surfactant.

The non-ionic surfactant is preferably selected from the group consisting of monoglycerides, diglycerides, poly-glycerol esters, non-ionic phospholipids, sterols and mixtures thereof. The food product typically comprises at least 3% of the non-ionic surfactant, preferably about 4% to 10%.

Preferred ionic surfactants are selected from the group consisting of cationic phospholipids, cationic non-fatty carboxylic acid esters, anionic lactylated fatty acid salts, anionic phospholipids, anionic non-fatty carboxylic esters, fatty acids and their metal salts. More preferred ionic surfactants are sodium stearyl lactylate (SSL), phosphatidic acid, and diacyl tartaric acid ester of monoglyceride (DATEM). Naturally occurring fatty acids that are contained in the non-ionic surfactant can also act as ionic surfactants in the composition.

The ratio of the non-ionic surfactant to ionic surfactant is preferably in the range of 10:1 to 30:1, most preferably about 20:1.

Virtually any edible oil can be used in the preparation of the food product. Preferred oils for use in the invention are vegetable oils such as soybean oil, sunflower oil, canola oil, corn oil, peanut oil, olive oil, rice bran oil, safflower oil and flaxseed oil. Vegetable oils that are low in saturated fatty acids are preferred. Other oils, such as fish, algal or fungal oils, may be used to provide the beneficial effects of omega fatty acids. Oils derived from animal fats by fractionation may also be used. The oil is present in the food product in an amount of about 20% to about 80%, preferably 40% to 60%.

The food product comprises from about 20% to about 80% water, more preferably about 20% to 60%.

In one preferred embodiment, the food product comprises about 4% to 7% monoglyceride, about 0.2% to 0.35% anionic surfactant, with the balance of the mass comprised of about 40% to 60% oil and about 20% to 60% water.

In a preferred embodiment, the product has the properties of a plastic fat or spread, such as margarine and shortening, in terms of texture and spreadability. The components and steps of the process can be adjusted to provide different consistencies such as a whipped topping or a mayonnaise.

In a preferred embodiment, the food product is selected from a margarine-like spread, flavored spreads including low fat spreads, dressings, dips, beverages and mayonnaise type products. Dairy products, incorporating the cellular solid matrix, such as ice cream and ice milk, whipped toppings, yogurt, soft cheeses, milk and cream substitutes are also included within the scope of the invention.

In another aspect, a whipped topping comprising a cellular solid as described above is provided. The whipped topping includes air pockets dispersed within the cellular solid.

In a preferred embodiment, the whipped topping includes a sweetener such as sugar, Splenda or aspartame. Other sweeteners not specifically mentioned here can also be used to impart a sweet flavor to the whipped topping. In one embodiment, the whipped topping comprises at least 10%, more preferably at least 25% sugar.

BRIEF DESCRIPTION OF THE DRAWINGS

Further objects, features and advantages of the invention will be readily apparent from the detailed description that follows and reference to the accompanying drawings, wherein.

DETAILED DESCRIPTION

Figure 1:
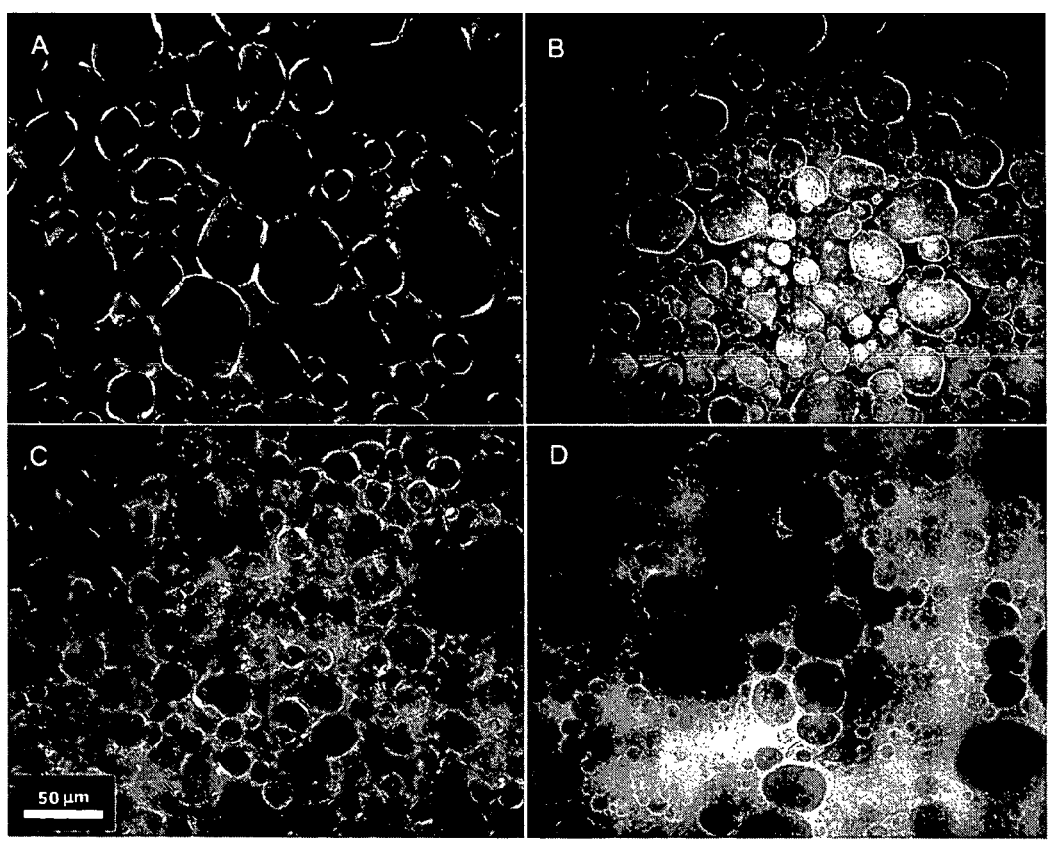
FIG. 1A is a polarized light image of a composition of the present invention.
FIG. 1B is a micrograph of a sample of a composition of the present invention stained with Nile Red.
FIG. 1C is a polarized light micrograph of another composition of the invention.
FIG. 1D is a micrograph of a rhodamine stained sample of a composition of the invention.

The present invention provides a novel, cellular solid matrix that is useful for the structuring of edible oil food products and the food product is typically a spread or topping that has the qualities of temperature cycling stability, spreadability and texture required by consumers. The cellular solid matrix of the present invention can also be used to structure other oil-based products such as coatings, barrier films, capsules for pharmaceutical ingredients, lotions, creams and carriers.

The cellular solid matrix is formed by combining an oil phase solution and an aqueous phase solution. The oil phase solution comprises a surfactant in oil stock solution. Various types of oils can be used. This includes various types of vegetable oil, fish oil and animal oils. Examples of vegetable oils include peanut oil, palm oil, flaxseed oil, olive oil safflower oil, sunflower oil rice bran oil and all other types of vegetable oils. To reap the most health benefits, it is preferable to use a vegetable oil that is low in saturated fatty acids. In certain circumstances, however, it may be desirable to use a tropical oil, which does include some saturated fatty acids. It may also be desirable to use a fish oil or other oils to incorporate the healthy long-chain omega-3 fatty acids that are contained therein. The stock solution typically contains about 3% to 30%, preferably about 5% to 15% w/w surfactant. A non-ionic surfactant is typically used. The surfactant component may contain both non-ionic and ionic surfactants. For example, the surfactant component may comprise a 10:1 to 30:1 ratio of non-ionic to ionic surfactant, preferably about 20:1. Various types of non-ionic surfactants known to those skilled in the art can be used in the present invention. Monoglycerides, diglycerides, poly-glycerol esters, non-ionic phospholipids and mixtures thereof are some examples of useful surfactants. Some examples of ionic surfactants that are useful in the present invention include cationic phospholipids, cationic non-fatty carboxylic acid esters, anionic lactylated fatty acid salts, anionic phospholipids, anionic non-fatty carboxylic esters, fatty acids and their metal salts. Naturally occurring free fatty acid contaminants can also act as an ionic surfactant. Specific ionic surfactants are sodium stearoyl lactylate (SSL), phosphatidic acid, and diacyl tartaric acid ester of monoglyceride (DATEM). It is clearly apparent to one skilled in the art that other ionic surfactants not specifically mentioned herein could also be used.

The stock solution is heated to a temperature where the surfactant melts in the oil. For example, monoacylglycerol can be added to a vegetable oil and heated until it melts. The temperature that the stock solution is heated to depends on the melting point of the solution. It is usually in the range of about 50° C. to 90° C. For example, for a 10% monoacylglycerol in vegetable oil stock solution, heating to about 85° C. is very effective.

The oil phase solution is mixed with an aqueous solution. The aqueous solution may comprise water from a variety of sources. It may be deionized and/or distilled and it may be buffered or not. The water may include colorings and/or flavorings and other additives such as stabilizers or sugars. Other types of aqueous solutions include syrup, juice, saline, etc. The aqueous phase may include polysaccharides and proteins. For example, it could contain sugars such as sucrose, maltose, glucose, fructose, dextrins, maltodextrins, cyclodextrins, as well as corn syrup, high fructose corn syrup, starch (amylose, amylopectin) and modified starches (starch derivatives), dextran, cellulose (microcrystalline and amorphous), methylcellulose, hydroxypropylcellulose, xanthan gum, agarose, and galactomannans (guar gum, locust bean gum). Other polysaccharides or proteins could also be added. The additional components and flavorings can be added before or after the aqueous phase is mixed with the oil phase. For certain components, it is preferable to add them after the aqueous and oil phases have been mixed and the cellular matrix has begun to form.

Alkaline, deionized water is often used, but it is not a requirement that the water be treated in this manner. The amount of aqueous phase added can vary, but best results are obtained when the combined composition comprises about 20% to 80% of the oily stock solution and conversely 80% to 20% of an aqueous solution. Especially good results are obtained when the aqueous phase and oily stock solution are present in approximately equal portions of each. For example, the combined composition could contain 40% oily stock solution and 60% water, 50% stock solution and 50% water or 60% stock solution and 40% water. The combined composition is mixed thoroughly and sheared while preferably slightly above the approximate melting point of the surfactant, the cellular solid structure is then formed. During the process, the surfactant, such as monoacylglycerol, appears to crystallize and form cell walls. The term crystallize is used herein in an every day sense to describe a type of solidification or condensation. It does not necessarily mean chemical crystallization as defined in a chemical dictionary. The cells of the product entrap oil in the lumen of the cells.

The present invention provides food products comprising a cellular matrix as described herein. The food products of the invention may optionally include other components such as colorants and additional nutrients. For example, beta-carotene and/or fat-soluble vitamins can be included. Beta carotene provides both color and health benefits. Vitamins also provide health advantages to the food products. The food products may also include salt, sugar and other flavorings.

The present invention provides the first example of a cellular solid being formed by first melting a surfactant in oil and then adding an aqueous solution. There is no need to add any hardstock to structure the product and there is no conversion of cis fatty acids into trans fatty acids. Thus, a novel, heart healthy product can be achieved which has the characteristics of taste and texture desired by consumers without the harmful components. The products of the present invention are useful as low calorie spreads, margarine-like spreads, dairy-like toppings, creamy fillings for cookies and pastries, puddings, ice cream and the like.

The surfactant concentration of the stock solution can vary, but the amount of non-ionic surfactant in the final product is preferably in the range of about 4% to 7%. For example, a 10% stock solution can be prepared which contains 10 grams of a solid surfactant such as monostearin, 0.5 grams of an ionic surfactant such as sodium stearoyl lactylate (SSL) and 89.5 grams of oil. If 60 mls of this stock solution is heated above the melting temperature of monostearin in oil (~73° C.), to about 85° C., and kept for half an hour to erase crystal memory. The melted monoglyceride in oil is allowed to cool to 75° C., and 40 mls of heated water (75° C.) are then added to this mixture. Thus, the final product will contain 6% of the monoglyceride. If a 20% stock solution were used then 40 mls of the stock solution would be mixed with 60 mls of water to achieve the same final monoglyceride concentration. A 10% stock solution has been found to be economical and easy to use. Aiming for a final monoacylglyceride concentration of about 4% to about 7% has been found to be useful for the structuring of a spreadable food product. A final monoglyceride concentration of 4% to 7% results in a spread having all the desirable features of texture, meltability and stability usually associated with margarine. The present invention provides the first description of a spread made entirely from vegetable oil, containing no trans fats, and no saturated animal fats or tropical oils.

A creamy topping according to the present invention typically comprises a final monoglyceride concentration of about 2% to 10%. Air is introduced into the cooled composition by whipping for a few minutes. This decreases the density and provides a fluffy topping. It is clearly apparent that once air is introduced into the composition the concentration or density of the monoglyceride will be more dispersed.

While it is preferable to use a vegetable oil which has a low level of saturated fatty acids, it may under certain circumstances, be desirable to use another type of oil. For example, tropical oils may be used in certain circumstances to promote certain flavors, texture and melting properties.

In other situations, it may desirable to use an oil that provides other advantages. For example, fish oil could be used to provide heart healthy long chain omega-3 fatty acids (such as DHA). In all cases, the cellular solid structure of the present invention eliminates the need for hydrogenation of the oil with the concurrent conversion to trans fatty acids.

In the process and product of the present invention, a cellular solid matrix is formed. Oil is trapped within the cells of the matrix as they are formed.

The process and product of the present invention differ significantly from that described by Heertje et al. in U.S. Pat. No. 6,368,653. Heertje et al combine a surfactant such as a monoglyceride with water to form a gel that they refer to as a "mesomorphic phase". Oil is then added and the mixture is vigorously agitated to break up the gel so that the oil is interspersed by bulk regions of mesomorphic phases that serve to structure the food product much in the same way as a hardstock would. The microstructure of fats produced using the Heertje et al. procedure is not that of a cellular solid matrix, but a collection of plate-like crystals.

For illustrative purposes, the cellular solid type of structure of the present invention can be seen by referring to FIGS. 1, 5, 6 and 7. These figures are examples of micrographs of samples of various compositions prepared according to the method of the present invention. The figures have been stained to with fat soluble and water soluble stains. It should be clearly understood that these figures are only examples of samples of compositions of the invention. Each composition will have a unique fine structure while maintaining the overall cellular solid type of structure. It is clearly apparent that varying the amount of the oil and the aqueous phase will result in different sized "cells".

FIG. 1 shows polarized light micrographs of a cellular solid matrix created by adding (A) 50% (v/v) water and (C) 40% (v/v) water to a 10% monoglyceride-in-oil stock solution. The micrographs demonstrate that cell size increases as the water content increases to 50% versus 40% (FIG. 1A vs. 1C). The microstructure of monoglyceride gels was characteristic of that of a cellular matrix, resembling a foam. The solidified walls of the cells interact with each other to form a matrix of cell walls. This results in the formation of a cellular solid structure that originates from a crystallized or condensed multilamellar structure.

The 50% water samples were stained for either oil or water content. When stained with the oil-soluble dye Nile Red (FIG. 1B), the oil component of the structure can be visualized.

Figure 5:
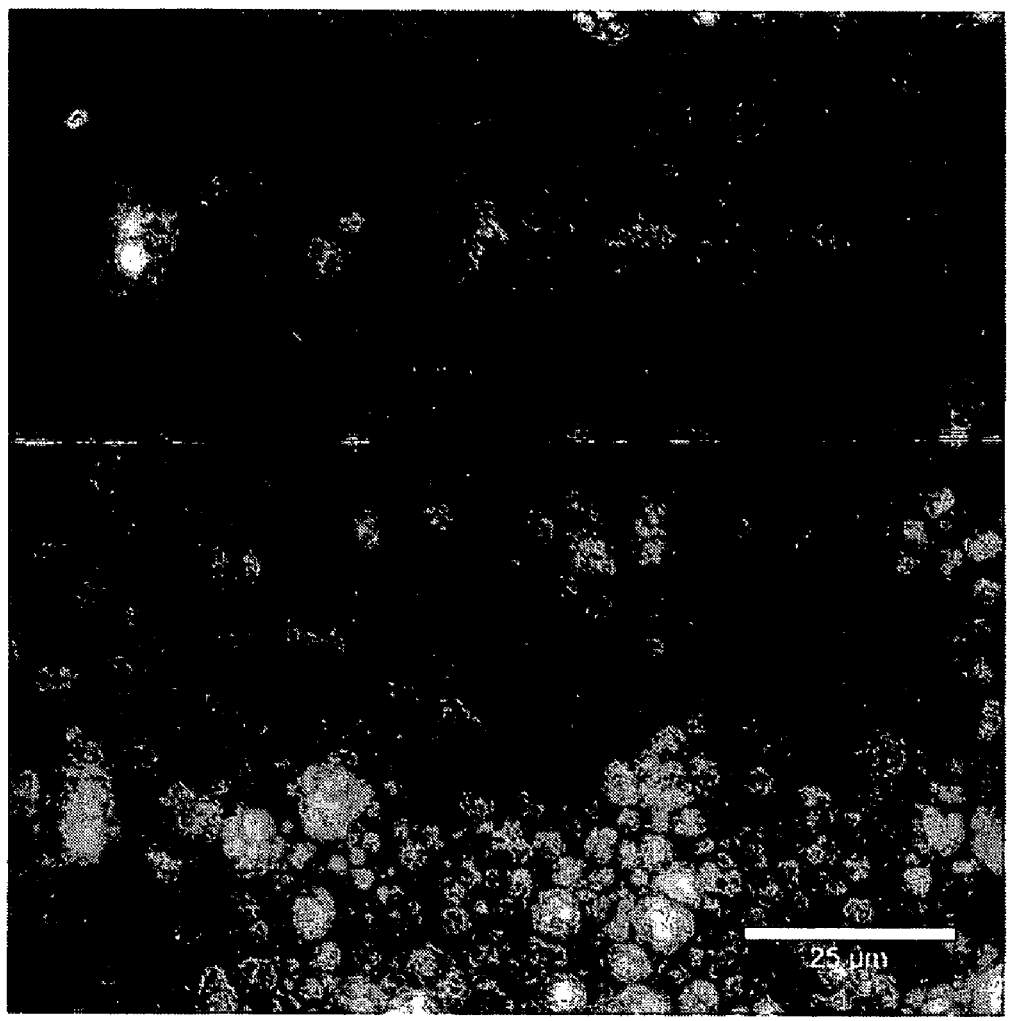
FIG. 5 illustrates a Nile Red stained sample of a composition according to the present invention.

The water-soluble dye, rhodamine, partitions only to areas that contain water. In the micrograph shown in FIG. 1D, water can be seen in the cell walls. FIG. 5 is a micrograph illustrating another sample stained with Nile Red. This is a confocal laser scanning micrograph of a composition prepared using a 60% oil phase containing monoglyceride and SSL and 40% aqueous phase. The stained oil appears as light colored globules.

Figure 6:
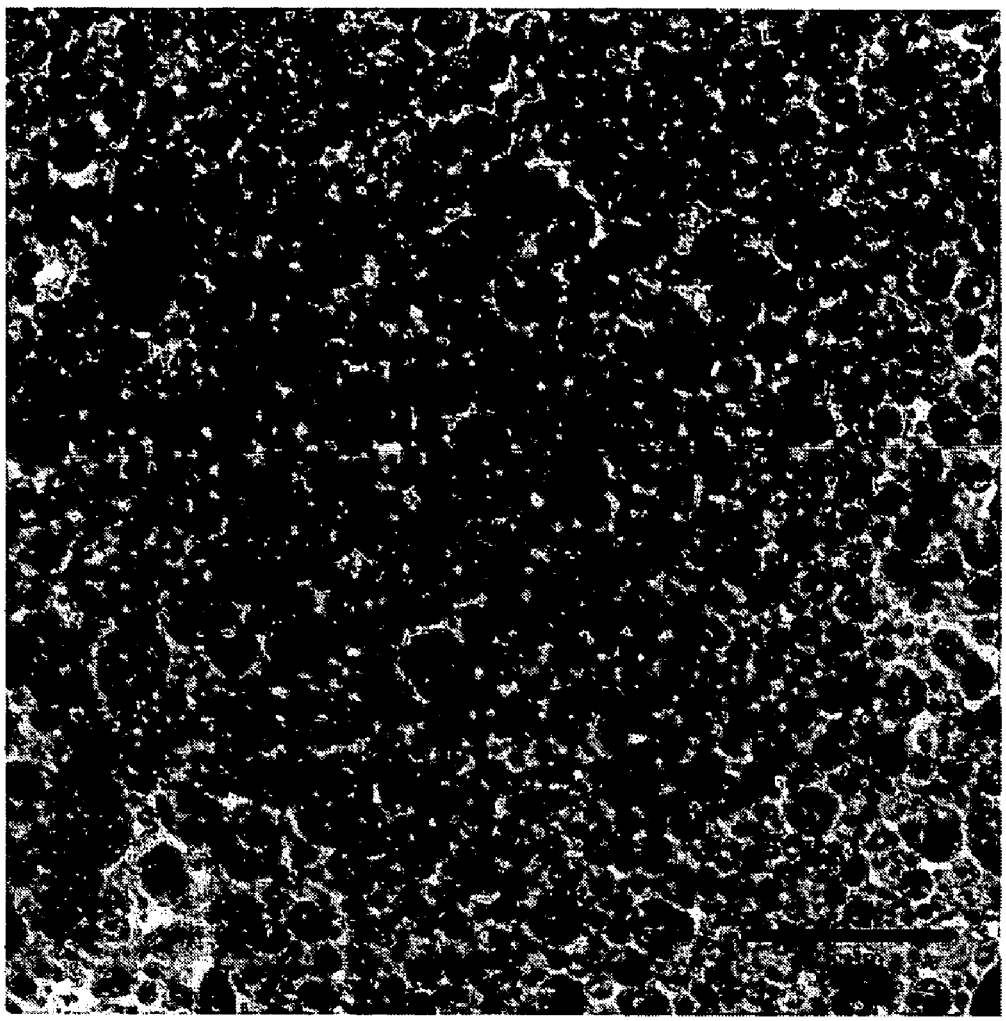
FIG. 6 illustrates a Coumarin-stained sample of a composition according to the present invention.

FIG. 6 illustrates the same type of composition stained with Coumarin. In this micrograph, the stained aqueous phase appears white in contrast to the unstained oil phase which appears dark.

These examples of compositions of the invention illustrate that monoglycerides dissolved in oil can self-assemble to form a cellular-solid network or matrix.

Figure 2:
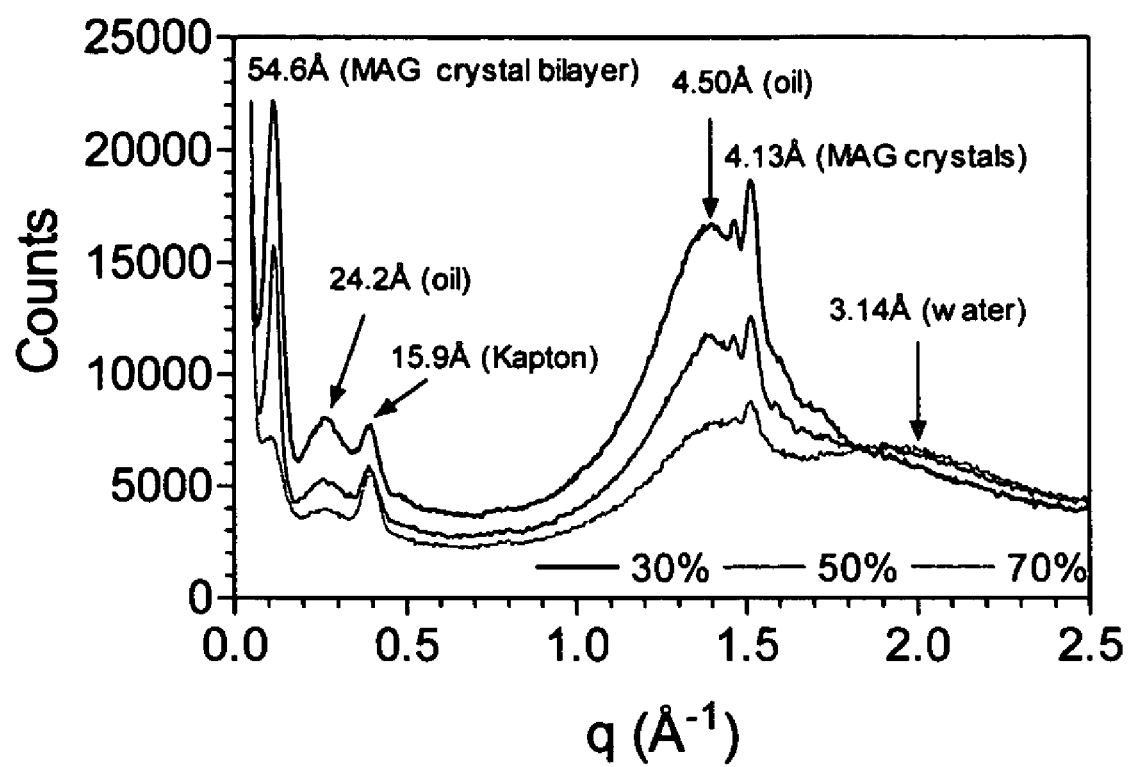
FIG. 2 illustrates a powder X-ray diffraction pattern of a structured composition of the present invention.

The formation of a cellular solid structure was confirmed by powder X-ray diffraction and the results are shown in FIG. 2. The reflection at 54.6 Angstroms corresponds to the size of the crystalline monoglyceride bilayers (the long axis of the unit cell, or the 001 plane). The reflection at 4.13 Angstroms corresponds to the lateral packing of the crystallized monoglyceride fatty acid chains.

Figure 3:
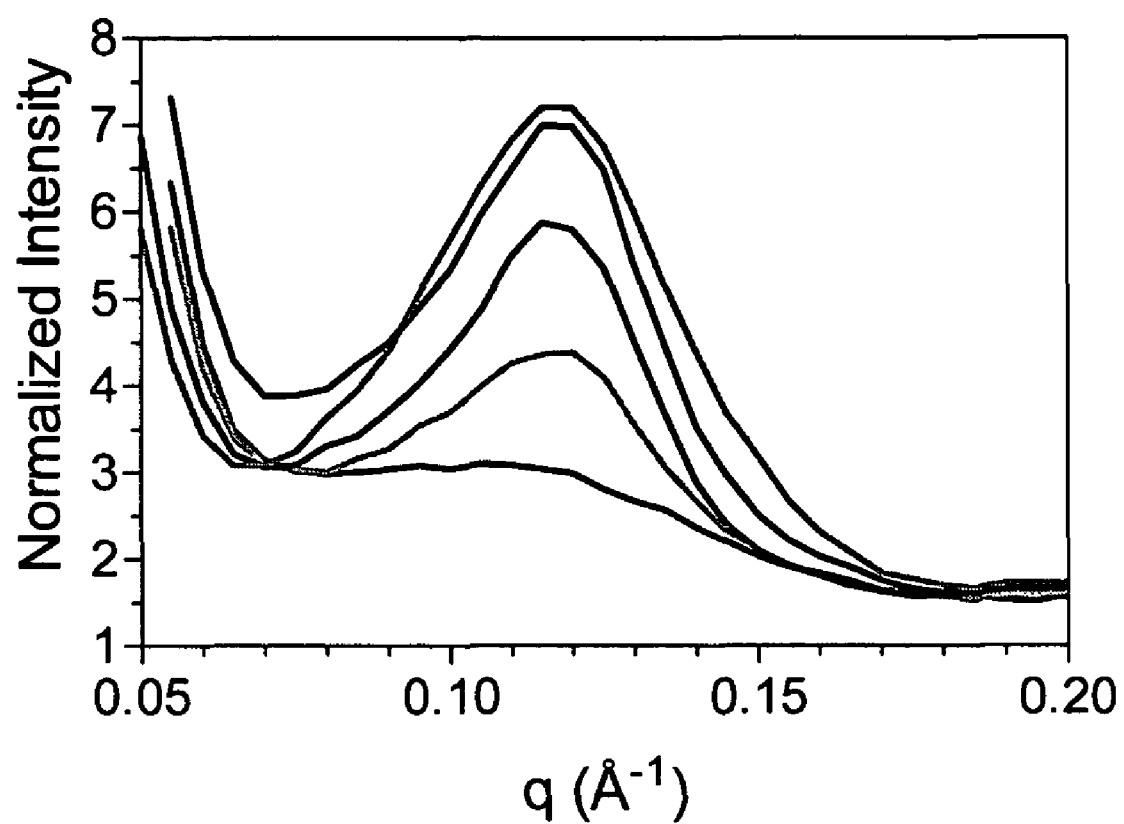
FIG. 3 is an enlarged normalized X-ray diffraction pattern of structures containing different amounts of water.

FIG. 3 illustrates an enlarged, normalized graph of this region. As more water is added (top to bottom: 27%, 40%, 50%, 60%, 70% water) it can be seen that the peak which corresponds to the size of the spacing in the structure does not increase. This indicates that the structure is stable and an increase in the proportion of water and/or oil does not cause swelling of the cellular walls. In other words, water and/or oil is held within the cellular structure, not trapped between lamellar layers.

Figure 4:
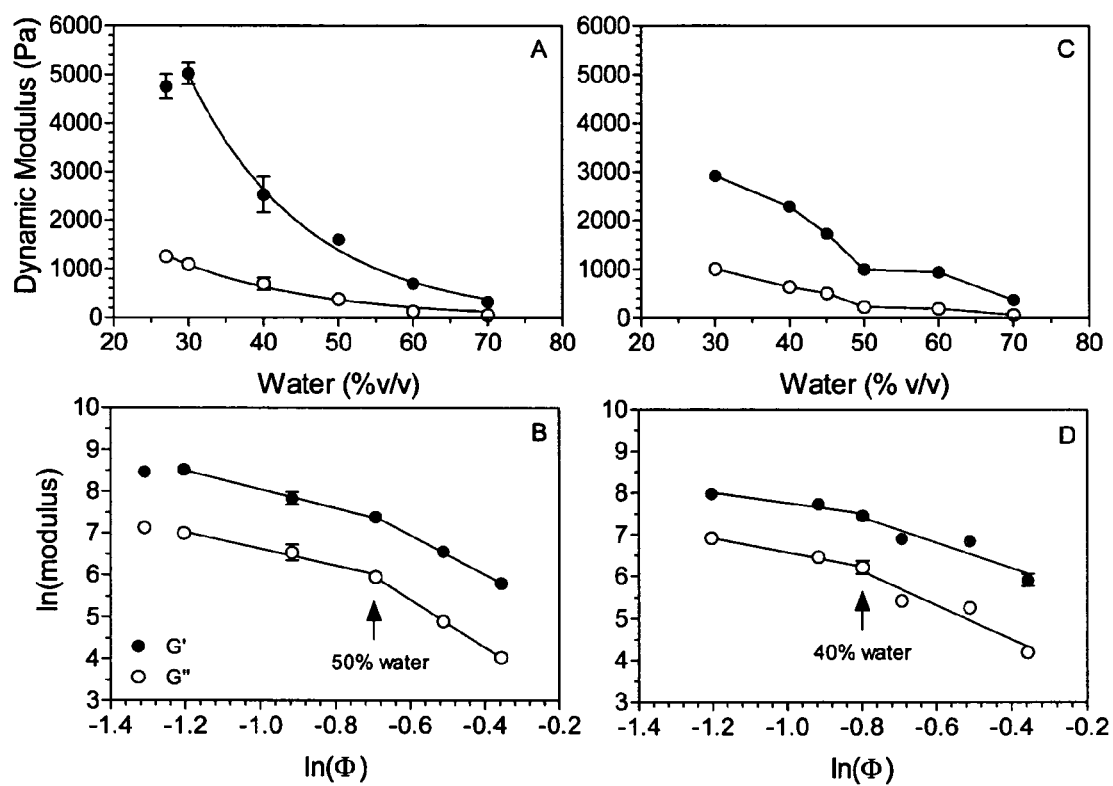
FIG. 4 demonstrates graphically the decreases in the storage and loss dynamic shear elastic moduli as a function of increasing water content.

Dynamic rheological studies on the different monoglyceride gels manufactured vigorous mixing (FIGS. 4A and 4B) and under gentle mixing (FIGS. 4C and 4D) showed a decrease in the elastic moduli of the gels as a function of increasing water concentration (FIGS. 4A and 4C). This is consistent with a predicted decrease in the Young's modulus (E) of a cellular solid with decreases in the volume fraction ($\phi$) of cell wall material (E~$\phi^m$). However, a break was also detected at ~50% (v/v) water in log-log plots of the elastic modulus versus the volume fraction of water (FIGS. 4B and 4D). This appears to correspond to an abrupt increase in cell size at and above ~50% water. For cellular solids, an increase in cell size is predicted to lead to a decrease in the elastic modulus. The results are consistent with this prediction, providing further evidence that oil-water mixtures can be structured using monoglyceride-based cellular solids. Sufficient mixing of the phases is required, but once the material starts setting and the cellular matrix forms, it is desirable to keep mechanical input (mixing, shearing, working) to a minimum, or avoid it altogether.

This novel oil structuring process opens up possibilities for the commercial manufacture of heart-healthy margarines, spreads, and dairy-like products without the use of tropical oils, hydrogenated fats or animal fats.

Figure 7:
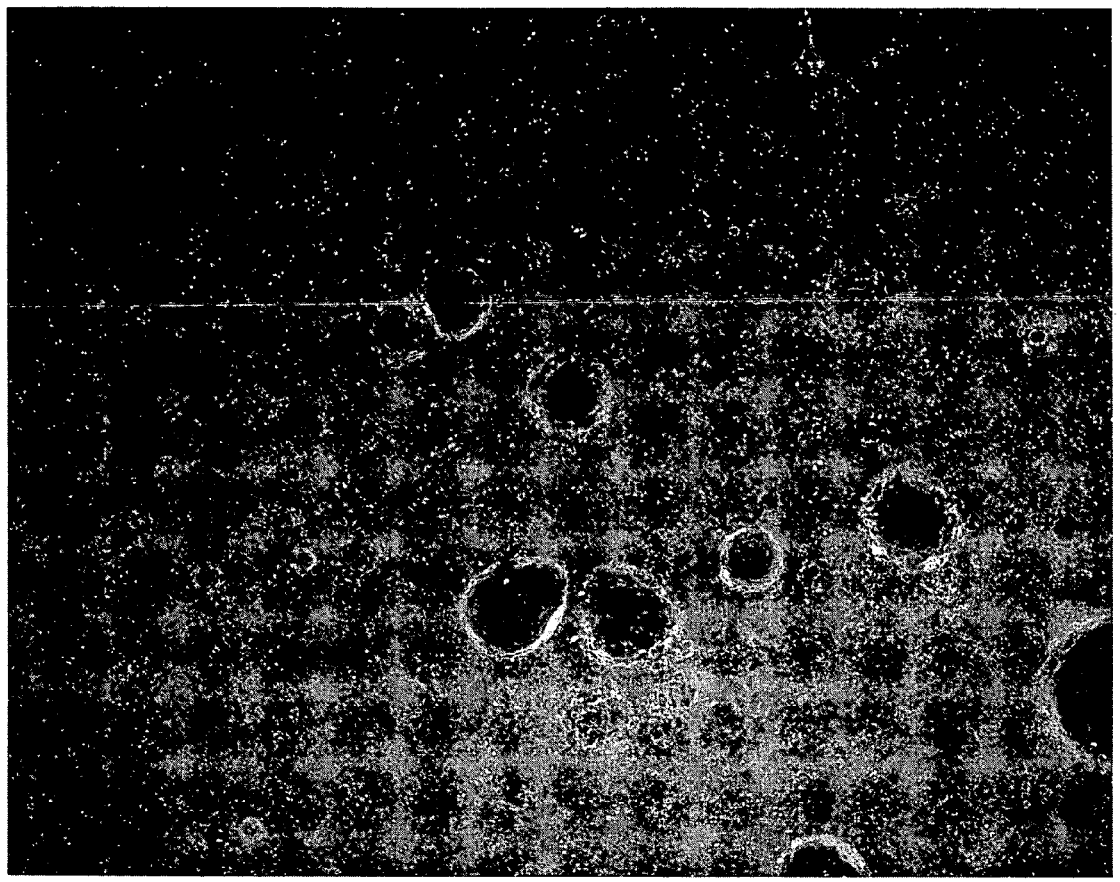
FIG. 7 illustrates air bubbles in a sample of a composition.

The method of the present invention can also be used to make whipped products that incorporate air pockets. The invention provides for a dairy-like topping that is prepared by whipping the composition to introduce air into the product. FIG. 7 illustrates an example of a composition that has air pockets in the structure.

It is clearly apparent that while the description has focused on the development of novel food products, a cellular solid matrix can also be used to structure other oil based products to be used as barriers, coatings, host/embedding/encapsulating media for a diverse range of compounds such as pharmaceuticals and other bioactive compounds such as proteins, membrane proteins, hydrophilic and hydrophobic peptides, as well as diverse preservatives.

The above disclosure generally describes the present invention. It is believed that one of ordinary skill in the art can, using the preceding description, make and use the compositions and practice the methods of the present invention. A more complete understanding can be obtained by reference to the following specific examples. These examples are described solely to illustrate preferred embodiments of the present invention and are not intended to limit the scope of the invention. Changes in form and substitution of equivalents are contemplated as circumstances may suggest or render expedient. Other generic configurations will be apparent to one skilled in the art. All journal articles and other documents such as patents or patent applications referred to herein are hereby incorporated by reference.

EXAMPLES

Although specific terms have been used in these examples, such terms are intended in a descriptive sense and not for purposes of limitation. Methods referred to but not explicitly described in the disclosure and these examples are reported in the scientific literature and are well known to those skilled in the art.

Example 1

Sample Preparation

Distilled monoacylglycerols (MAG's) and anionic surfactant were provided by Danisco (Kansas, Mo.). They included Grinsted® sodium steaoryl lactylate (SSL) P55 anionic surfactant, and Dimodan® HS K-A (10% monopalmitin, 90% monostearin). Sodium hydroxide (2N NaOH) was obtained from Fischer (St. Louis, Mo.), vegetable oils (corn, canola, sunflower, soybean, peanut) were purchased in a local supermarket, and deionized water was of milliQ grade.

A 10% (w/w) stock of MAG in vegetable oil—all oils performed equally well—was prepared by melting 10 g of the solid MAG (m.p. ~73° C.) and 500 mg of the SSL powder in 89.5 g of oil at 85° C. for 30 minutes and cooled to 75° C. Appropriate volume fractions of 75° C. alkaline deionized water (5 drops of 2N NaOH in 100 mL), in the range 20% to 70% (v/v), were then added to the MAG-oil stock in a glass bowl heated to 75° C. The material was mixed with the aid of an electric hand mixer until a macroscopically homogeneous white paste was obtained, and then allowed to set undisturbed at room temperature (22° C.). The material set almost immediately. For 100 mL batches, setting was complete within 30 minutes. The mixture preferably contains at least 4% (w/w) distilled monoglyceride for proper gel formation and stability.

Example 2

Dynamic Shear Rheology

Dynamic rheological measurements were carried out with a TA Instruments AR2000 rheometer (TA Instruments, New Castle, Del., USA) at 20° C. Approximately 3 g of monoglyceride gels were gently spread on the temperature-controlled (Peltier element) rheometer base. A 60 mm flat acrylic plate was lowered onto this film until a gap size of 1 mm was attained. This was immediately followed by strain sweeps from to 0.003% to 0.80% shear strain at a frequency of 1 Hz. The increase in strain was logarithmic with a sampling frequency of 10 points per decade. Four samples were analyzed for each mixture and the average and standard deviation reported. At least three separate sets of experiments were conducted.

Example 3

Polarized Light Microscopy

Images were acquired using a Leica DM RXA2 upright microscope (Leica Microsystems AG, Bannockburn, Ill., USA) equipped with epi-polarized reflection illumination and a Retiga 1300 monochrome camera (QImaging, Burnaby, B.C., Canada). Three samples of each mixture were gently spread under a coverslip within the first 10 minutes of setting and examined using a 40x objective in polarization or fluorescence modes. For the fluorescence experiments, Nile Red and Rhodamine dyes were dissolved in either the oil (Nile Red) or the water phase (Rhodamine) prior to mixing. The final concentration of the dye was 0.05% (w/w) in the system. The filer L5 filter cube from Leica was used (exc: BF 480/40 nm; dichroic mirror; em: BF 527/30 nm). All images were acquired and archived as single, 1280×1024 pixel, 8 bit, untagged documents. Magnification bars and labels were added using Adobe Photoshop 5.5. At least three separate sets of experiments were conducted.

Example 4

Powder X-Ray Diffraction

Monoglyceride gel material was smeared between two pieces of Kapton™ tape forming the walls of a custom sample holder. This holder was then placed in an x-ray diffractometer comprised of a Huber four circle goniometer and Nonius sealed tube x-ray source with copper target. All measurements were taken using a scintillation point detector at room temperature. The Lithium fluoride monochromator was set to select the Cu K-alpha1 line (wavelength=1.54 Angstroms). The angular resolution of the spectrometer was 0.1 deg. At least three separate sets of experiments were conducted.

Example 5

Confocal Laser Scanning Microscopy

Image volumes through a depth of 18 micrometers were acquired using a Leica TCS SP II confocal laser scanning microscope (Leica Microsystems Heidelberg GmbH, Heidelburg, Germany), a Leica DM IRBE Inverted light microscope, a 40×, NA 1,25 Oil Immersion Objective and both UV and Argon Lasers. Coumarin images were obtained using the UV laser, 364 nm excitation, and emission between 425-475 nm. Nile Red images were acquired using the Argon laser, 488 nm excitation, and emission between 600-750 nm. The dye concentrations used for coumarin and nile red were 0.0025% (w/w) in either the aqueous phase (coumarin), or oil phase (nile red). Image stacks were then deconvolved using Autoquant's (Watervliet, N.Y.) Blind Deconvolution software and projections.

Example 6

Manufacture of a Whipped Topping

A 10% (w/w) stock of monoglyceride in canola oil with 0.5% SSL was heated to 80° C. and thoroughly mixed. An aqueous solution of deionized water with 10 drops of 10N NaOH, 25% (w/w) sugar (sucrose), containing 0.01% to 1%, preferably 0.05% to 0.1% (w/w) of one or more polysaccharides (for example hydroxypropylcellulose or guar gum) was also heated to 85° C. The solutions were allowed to cool to 75° C. and mixed together. The samples were gently mixed for one minute and sheared while hot using a hand-held household mixer (Braun) for 30 seconds until a homogenous white soft, fluffy material was obtained. The mixture was then cooled to 60° C. and placed in the metal bowl of a Hobbart mixer cooled to 10° C. This mixture was then whipped while cooling to incorporate air. Whipping for approximately 5 minutes lead to a reduction in density from ~1.0 g/mL to 0.5 g/mL. The foam was then stored at both refrigeration and room temperatures. The resulting product has the taste and texture of a whipped dairy topping similar to whipped cream.

What is claimed is:

1. A process for the preparation of a cellular solid, said process comprising the steps of:
   a. preparing a stock solution of surfactant in oil wherein the stock solution comprises about 3-30% (w/w) surfactant and wherein the surfactant comprises an ionic surfactant and an non-ionic surfactant;
   b. heating the stock solution to at least above the melting point of the surfactant;
   c. adding a heated aqueous solution comprising a saccharide or protein to form an oil/surfactant/aqueous composition comprising about 10 to 70% water;
   d. vigorously mixing the composition; and
   e. allowing the composition to cool, wherein the composition sets upon cooling to form a cellular solid.

2. A process according to claim 1, wherein the stock solution comprises about 5% to 15% (w/w) of surfactant.

3. A process according to claim 1, wherein the aqueous solution is alkaline, deionized or distilled water.

4. A process according to claim 1, wherein the aqueous solution comprises a polysaccharide or protein.

5. A process according to claim 1 wherein the composition comprises about 20% to 60% water.

6. Process according to claim 1, wherein the oil is a vegetable oil, a fish oil, or an animal oil.

7. Process according to claim 6, wherein the oil is a vegetable oil.

8. Process according to claim 7, wherein the vegetable oil is selected from the group consisting of palm oil, palm oil fractions, cottonseed oil, sesame oil, and almond oil.

9. Process according to claim 7, wherein the vegetable oil is selected from the group consisting of corn oil, canola oil, sunflower oil, safflower oil, soybean oil, peanut oil, olive oil, flaxseed oil, and rice bran oil.

10. Process according to claim 1 comprising the further step of whipping the composition.

11. Process according to claim 10 wherein the composition is whipped while it is setting upon cooling.

12. Process according to claim 1 comprising the further step of adding a protein or polysaccharide additive to the composition.

13. Process according to claim 12 wherein the additive is added while the composition is setting upon cooling.

14. Process according to claim 1, wherein the oil is an algal or fungal oil.

15. A cellular solid prepared according to the process of claim 1, said cellular solid comprising an oil/surfactant/water cellular solid matrix composition, wherein the surfactant comprises an ionic surfactant and a non-ionic surfactant, said ionic surfactant being sodium stearoyl lactylate and said non-ionic surfactant being a monoglyceride and wherein the cellular solid comprises about 4% to 7% monoglyceride, about 0.2% to 0.35% sodium stearoyl lactylate, and the mass balance remaining comprising 20% to 80% w/w oil and 20% to 80% water.

16. A whipped topping comprising a cellular solid as defined in claim 15, and air pockets.

17. A whipped topping according to claim 16 comprising a sweetener.

18. A whipped topping according to claim 17 comprising at least 10% sugar.

19. A whipped topping according to claim 18 comprising at least 25% sugar.

* * * * *